June 21, 1960

J. G. INGRES 2,941,512

BOOSTER MOTOR MECHANISM

Filed Nov. 4, 1955

INVENTOR
JEANNOT G. INGRES
BY John F. Phelps
ATTORNEY

June 21, 1960

J. G. INGRES 2,941,512

BOOSTER MOTOR MECHANISM

Filed Nov. 4, 1955

INVENTOR
JEANNOT G. INGRES

BY John F. Philip
ATTORNEY

United States Patent Office 2,941,512
Patented June 21, 1960

2,941,512

BOOSTER MOTOR MECHANISM

Jeannot G. Ingres, Dearborn, Mich., assignor to Kelsey-Hayes Company, a corporation of Delaware Filed Nov. 4, 1955, Ser. No. 544,952

9 Claims. (Cl. 121—38)

This invention relates to a booster motor mechanism and is an improvement over the structures shown in my copending applications Serial Nos. 531,437, filed August 30, 1955, and 540,240, filed October 13, 1955, now Patent No. 2,877,745, granted March 17, 1959.

In my copending application Serial No. 531,437, I have disclosed a booster brake mechanism for motor vehicles wherein a novel type of valve mechanism cooperates with other parts of the apparatus to provide a particularly smooth operating braking action. In such construction, a pedal operated master cylinder is employed for displacing fluid for two purposes, one to operate the valve mechanism for the booster motor and the other to assist the booster motor in applying braking pressures to the wheels of the vehicle and incidentally to provide the operator with "feel" reaction, particularly after line pressures reach 80–90 p.s.i. or the brake shoes engage the brake drums.

The valve mechanism and the operating means therefor are particularly novel in that they provide a soft initial brake pedal, the valve actuation taking place promptly upon initial displacement of fluid from the master cylinder. The valve device per se functions so as to provide for restricted initial communication between the booster motor and the source of operating pressure therefor, thus preventing sudden energization of the booster motor with a resultant "jumping" of the piston thereof from its normal off position. The latter operation is highly disadvantageous and very greatly disturbs the desired "feel" in a vehicle brake pedal.

The structure of my copending application Serial No. 531,437 provides another distinct advantage in combination with the energization of the booster motor in that it provides a fluid pressure responsive device, comprising a diaphragm, for reacting against the brake pedal with a force proportionate to the degree of energization of the booster motor during initial phases of brake operation. Thus there is provided an elastic fluid reaction which progressively builds up during initial brake pedal operation, which reaction is taken over by the hydraulic reaction inherently provided by the mechanism when fluid displaced from the master cylinder flows behind the booster operated plunger to assist in generating brake applying pressures.

The structure of my Patent No. 2,877,745, referred to above, is an improvement over the structure just discussed above in that it provides for a delayed elastic fluid reaction against the brake pedal, thus preventing too rapid a building up of the elastic fluid pressure reaction to more effectively preserve the "soft" initial pedal action as is highly desirable. This is done by providing a diaphragm subject to pressures transmittted to the booster motor by the valve mechanism and by providing the diaphragm with biasing means acting against a portion of the diaphragm to render such portion of the diaphragm ineffective for responding to booster motor pressures during initial stages of brake operation. Thus only the central portion of the diaphragm is utilized to provide initial elastic fluid pedal reaction, and the biasing means for the diaphragm is overcome in somewhat later stages of brake operation to provide a smooth transition between initial brake operation and the stage of operation in which the hydraulic reaction referred to above becomes effective.

An important object of the present invention is to provide a combination of elements generally similar to the structures of the copending applications referred to, wherein a different and hydraulically operated means is provided for delaying the effectiveness of the reaction diaphragm for transmitting its full reaction effect to the brake pedal in the initial stages of operation of the brakes.

A further object is to provide such a mechanism wherein a plunger of relatively large area is subjected to movement by fluid from the master cylinder for initially operating the valve mechanism, and to provide means automatically operative, after initial booster motor energization has taken place, for reducing the effectiveness of the area of the plunger referred to for transmitting movement to the valve mechanism, thus rendering the reaction diaphragm more effective for resisting movement of the hydraulically operated plunger and thus providing for increased pedal resistance in the stage of operation preceding the transmission of hydraulic reaction to the brake pedal.

A further object is to provide such an apparatus wherein the relatively large hydraulically operated plunger is associated with a smaller opposing plunger which becomes effective under predetermined master cylinder pressures for reducing, in effect, the effective area of the larger hydraulically operated plunger in accordance with the area of the smaller plunger, thus rendering the reaction diaphragm more effective for resisting pedal operation, and thereby providing for progressively increasing elastic fluid reactions against the pedal to smooth out the transition of resistance from initial elastic fluid pressure resistances to direct hydraulic pressure resistance in accordance with line pressures.

A further object is to provide such an apparatus the structure of which is of such character as to permit the use of a somewhat smaller casing for the diaphragm and a smaller and less expensive diaphragm.

Other objects and advantages of the invention will become apparent during the course of the following description.

In the drawings I have shown one embodiment of the invention. In this showing:

Figure 1:
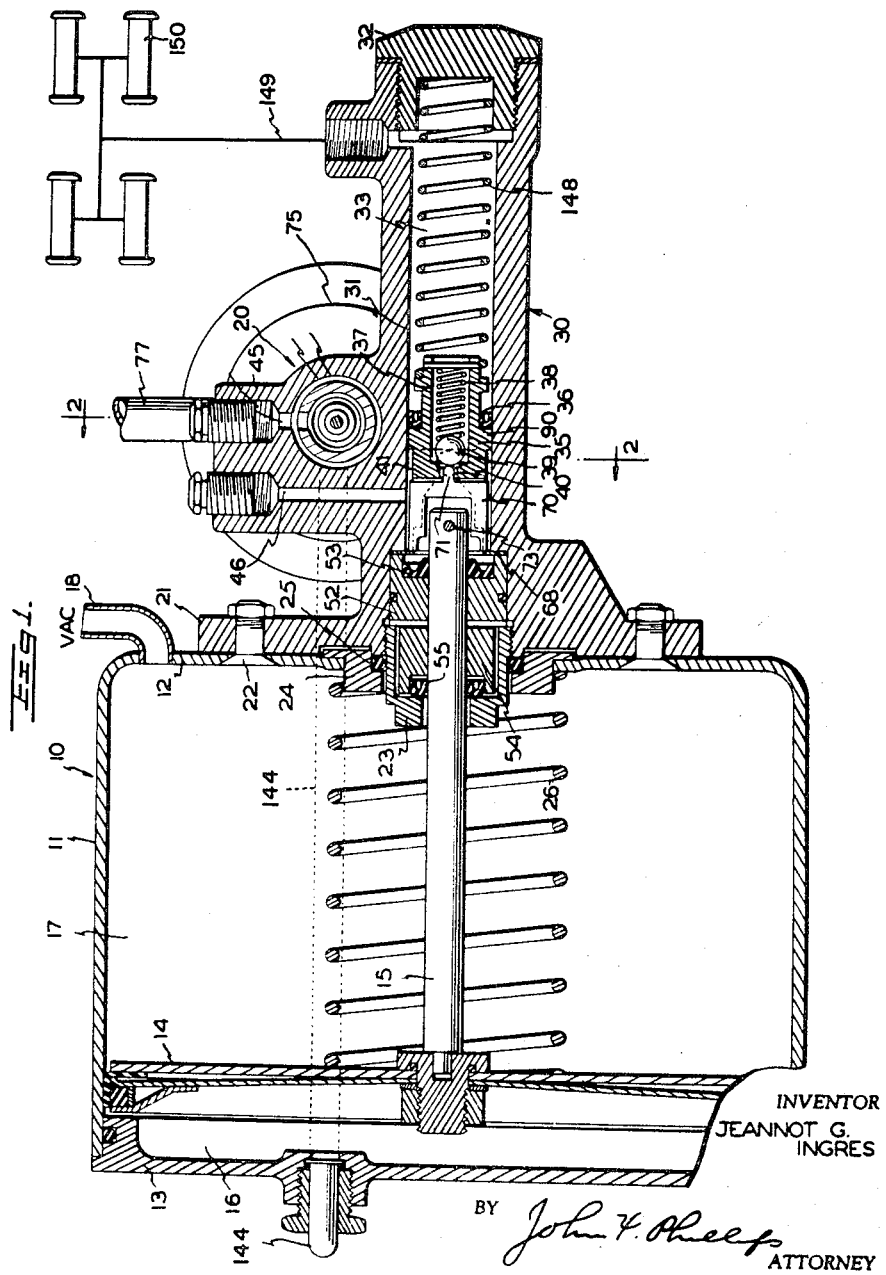
Figure 1 is a longitudinal sectional view taken axially through the booster motor and associated elements, parts being diagrammatically shown.

Referring to Figure 1, the numeral 10 indicates a booster motor as a whole shown as comprising a cylinder 11 having a preferably integral head 12 at one end thereof and a separate head 13 at the other end. The motor 10 may be of any desired type of fluid motor and has been shown in the present instance as being provided with a piston 14 reciprocable in the cylinder 11 and provided with a power transmitting piston rod 15. The piston 14 is shown in its normal position in Figure 1 and divides the cylinder 11 to form a variable pressure chamber 16 and a constant pressure chamber 17. The motor preferably is of the vacuum suspended type, in which case a duct 18 affords fixed communication between the chamber 17 and a suitable source of vacuum (not shown).

A cast body 20 is arranged adjacent its cylinder head 12 and is provided with a cylindrical flange 21 bolted as at 22 to the head 12. A nut 23 surrounds the piston rod 15 and is threaded into the adjacent end of the body 20. An annular member 24 is fixed in position relative to the head 12 and flange 21 and retains in position an O-ring or similar seal 25 surrounding the nut 23. A return spring 26 seats at one end against the piston 14 and at its opposite end against the head 12, surrounding the annular member 24.

The body 20 is provided with an extension 30 coaxial with the cylinder 10 and piston rod 15 and is provided with a bore 31 closed at one end by a cap 32 and forming a hydraulic pressure chamber 33. A plunger 35 is slidable in the bore 31 and is sealed by a double-lipped seal 36. The plunger 35 has a bore 37 in which is arranged a spring 38 engaging and adapted to seat a ball valve 39 to tend to close a port 40 comunicating between the bore 37 and a chamber 41 formed by the bore 31 to the left of the plunger 35 as viewed in Figure 1.

An integral laterally extending enlargement 45 is formed on the body 20 and has formed in one side thereof a passage 46 communicating with the chamber 41 and closed at its opposite end by a conventional bleed plug forming no part of the present invention.

Within the left-hand end portion of the body 20 is mounted a piston rod bearing 52 preferably provided with a double-lipped cup 53 to effectively seal against leakage around the piston rod 15. A second piston rod bearing 54 floats within the nut 23 and is also provided with a double-lipped seal 55 surrounding the piston rod 15.

At its left-hand end as viewed in Figure 1, the plunger 35 is axially recessed to receive the adjacent end of the piston rod 15. The left-hand end of the plunger 35 seats against a washer 68 maintained in position by the bearing 52. Such end of the plunger 35 is also diametrically slotted to receive a U-shaped member 70 the ends of the arms of which, in the off positions of the parts, also engage the washer 68. The member 70 is provided with a projection 71 which, in the off positions of the parts, extends through the opening 40 to unseat the ball 39 and thus connect the chambers 33 and 41. The piston rod 15 extends between the arms of the member 70, as viewed in Figure 1, and is connected to the plunger 35 by a pin 73.

Figure 2:
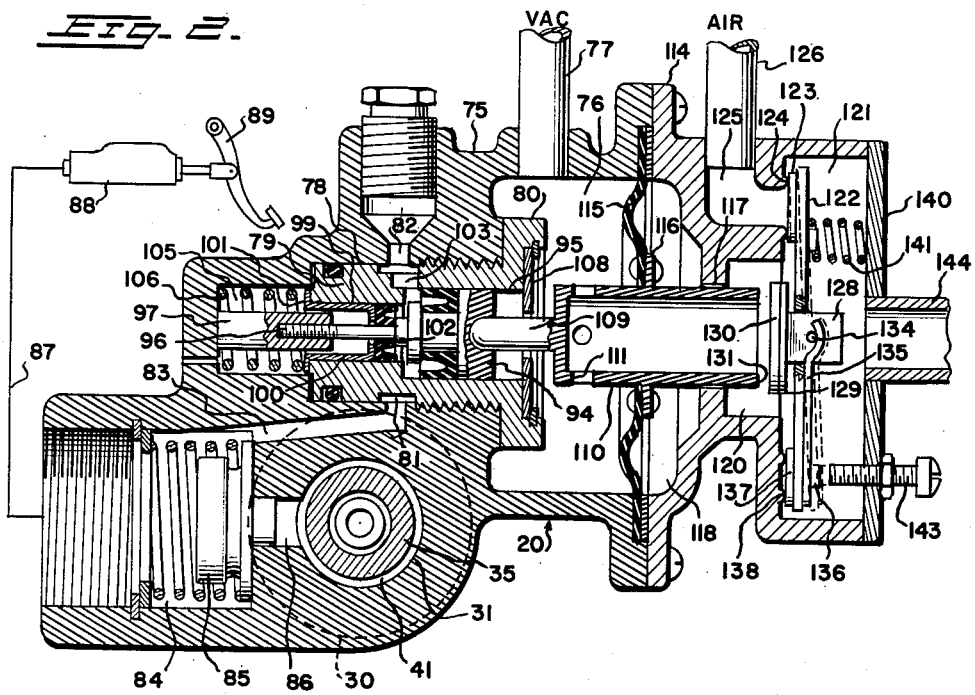
Figure 2 is a section taken generally on line 2—2 of Figure 1, all of the parts being shown in their off positions and the valve lever being shown in dotted lines in the position it will occupy in initial booster motor energization.

An annular enlargement 75 is preferably formed integral with the body 20 and has its axis offset from the axis of the bore 31 as shown in Figure 2. The enlargement 75 has formed therein a vacuum chamber 76 communicating through a line 77 with a suitable source of vacuum (not shown). The body 20 is further provided with a bore 78 into which projects a sleeve 79 threaded into the right-hand end of the bore 78 as shown in Figure 2 and provided with a polygonal head 80 for tightening it in position. The sleeve 79 is provided with an annular groove 81 communicating at its upper end, as viewed in Figure 2, with a passage 82 closed at its upper end by a conventional bleed screw. The passage 82 is drilled diametrically in the body 75 with respect to the sleeve 79 and has its lower end communicating with a passage 83 opening into a chamber 84 in which is arranged a conventional residual pressure valve 85. Such valve controls communication between the chamber 84 and the chamber 41 through a passage 86. The chamber 84 communicates through a hydraulic line 87 with a conventional master cylinder 88 operable by a pedal 89 shown in the present instance as being of the depending type. It will be noted that the passage 86 opens into the chamber 41 just behind an annular flange 90 formed on the plunger 35 and against which the seal 36 seats as shown in Figure 1.

A sealed plunger 94 is slidable in a bore 95 formed in the sleeve 79 and is provided with an axially projecting stem 96 preferably threaded into an elongated stop member 97. To the left of the plunger 94 the bore 95 is reduced in diameter as at 99 to receive a cup 100 having a flange 101 normally seating against the adjacent end of the sleeve 79. The cup 100 is provided with a seal 102 so that it acts as a plunger under conditions to be described, and such plunger is of substantially smaller diameter than the plunger 94. The space between the two plungers referred to is open to the groove 81 through a port 103.

Referring to Figure 2, it will be noted that an axial chamber 105 opens into the bore 78 and houses a spring 106 engaging the flange 101 to tend to maintain this flange against the adjacent end of the sleeve 79. The stop member 97 engages the end wall of the chamber 105, and the latter is vented to the atmosphere, as shown.

Figure 3:
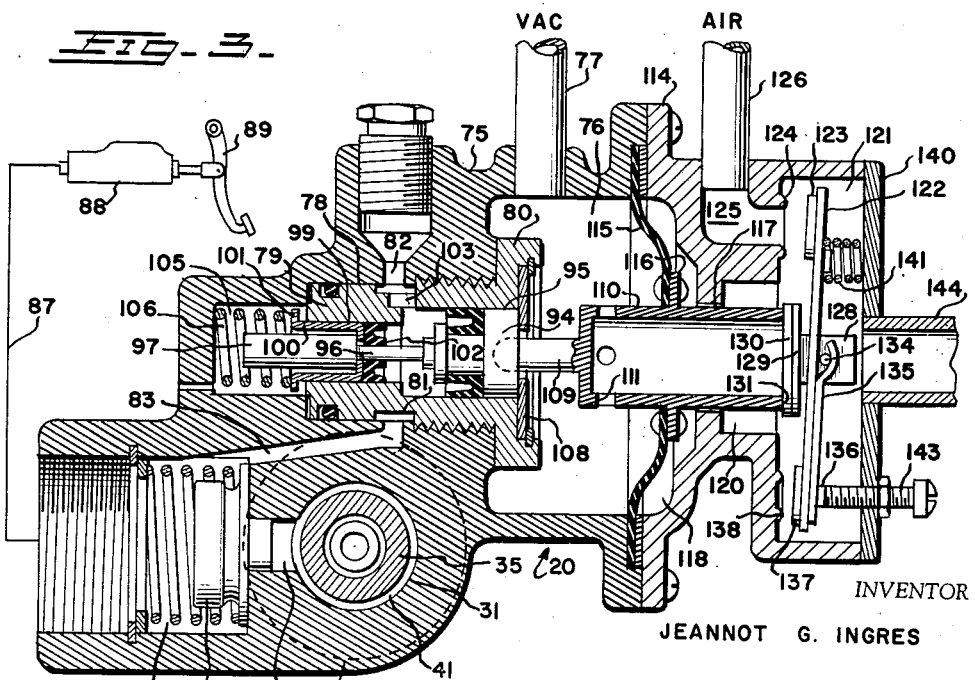
Figure 3 is a similar view showing all of the parts in the positions they will occupy during maximum booster motor operation.

A stop washer 108 is carried by the right-hand end of the sleeve 79 and acts positively to limit movement of the plunger 94 to the right to the position shown in Figure 3. Through the washer 108 projects a stem 109 engaging in a socket in the plunger 94 to transmit movement from this plunger to a sleeve or tubular member 110 ported as at 111 so that the interior of such member is in fixed communication with the vacuum chamber 76.

A cover member 114 is fixed to the enlargement 75 and clamps in position the outer periphery of a reaction diaphragm 115 which may be smaller and more simply and economically manufactured than the corresponding diaphragms of the copending applications referred to above. The inner periphery of the diaphragm 115 is fixed to a flange 116 carried by the tubular member 110. The latter member is relatively loosely slidable through an opening 117 formed in the cover member 114, and this member forms with the diaphragm 115 a chamber 118 subject to variations in booster motor pressures as further described below.

The play provided in the opening 117 around the tubular member 110 provides for the flow of air or other elastic fluid between the chamber 118 and an outer chamber 120 surrounding the right-hand end of the tubular member 110 as viewed in Figure 2. The chamber 120 in turn communicates with a chamber 121 formed in the cover member 114 and housing the valve mechanism for the motor, the formation of the chamber 121 and valve mechanism being fully disclosed in my copending application Serial No. 531,437, referred to above. The valve mechanism per se comprises a lever 122 in the chamber 121 having at one end a resilient high pressure valve 123 normally engaging a seat 124 leading into a high pressure chamber 125 in fixed communication with a source of relatively high pressure, preferably the atmosphere, through a pipe 126. The lever 122 intermediate its ends has relatively loose connection with a flat shank 128 carrying at its inner end a disk 129 to which is fixed a low pressure or vacuum valve 130 engageable with the adjacent end 131 of the tubular member 110, such end 131 constituting a valve seat. Inasmuch as the lever 122 changes its angular positions relative to the stem 128, as shown in dotted lines in Figure 2 and in solid lines in Figure 3, the stem 128 projects loosely through the lever 122. The stem 128 carries a pin 134 engaged by a spring leaf 135 secured to the lever 122 by a rivet or the like 136 carried by the end of the lever 122 opposite the valve 123. A preferably resilient washer 137 is carried by the lever 122 adjacent the rivet 136 and normally engages an annular rib 138 formed integral with the cover member 114.

The chamber 121 is closed by a cap 140. A spring 141 engages at one end against this cap and at its other end against the lever 122 between the axis of the valve seat 124 and the valve 130. This spring therefore biases the lever 122 to the normal off position shown in solid lines in Figure 2.

This cap 140 carries a screw 143 normally spaced from the rivet 136 and the latter acts as a stop to limit movement of the lower end of the lever 122, as viewed in Figures 2 and 3, toward the right. A duct 144 communicates at one end with the chamber 121 and at its other end with the variable pressure motor chamber 16 (Figure 1).

Referring to Figure 1, it will be noted that the hydraulic chamber 33 is provided with a spring 148 biasing the plunger 35 to its normal position. The chamber 33 is shown diagrammatically as being connected through suitable lines 149 with the four wheel cylinders 150 of a motor vehicle. It will be apparent, however, that the present apparatus is not limited to generating pressures in all four wheel cylinders but may be employed in other types of systems.

Operation

The parts normally occupy the positions shown in Figure 1 and in solid lines in Figure 2. The motor chamber 17 is in constant communication with the low pressure source, preferably the vacuum of the intake manifold of the vehicle engine. Referring to Figure 2, it will be noted that the air valve 123 is normally seated and the vacuum valve 130 normally open, and accordingly vacuum will be communicated through the tubular member 110, chambers 120 and 121 and duct 144 to the motor chamber 16. Accordingly, the piston 14 will be normally vacuum-suspended.

When the apparatus is to be operated, the pedal 89 will be depressed to displace fluid through line 87 (Figures 2 and 3) into the chamber 84, whence it flows through passage 83 and groove 81 and through port 103 into the space between the hydraulic plungers in the bores 95 and 99. Attention is invited to the fact that the spring 106 normally seats the flange 101 against the sleeve 79 and that the stop member 97 normally has its inner end spaced from the inner end of the cup 100.

Accordingly, hydraulic fluid flowing between the hydraulic plungers will move the plunger 94 toward the right while the plunger comprising the cup 100 and seal 102 remains stationary. The stop member 97 moves freely in the cup 100. Movement of the plunger 94 to the right will engage the seat 131 against the valve 130, thus disconnecting the chamber 118 from the chamber 120. Slight additional movement of the parts as described will transmit movement to the lever 122 centrally thereof to move such portion of the lever to the right as viewed in Figure 2, for example to the dotted line position shown in such figure. The spring 141 tends to hold its adjacent end of the lever 122 against movement and, accordingly, the lower end of the lever as viewed in Figure 2 will swing to the right until the rivet or stop member 136 engages the screw 143. This action tips the valve 123 on its seat 124 to "crack" the lower end of the valve 123 as viewed in Figure 2, thus providing for a restricted flow of air from the chamber 125 into the chamber 121. This air flows through duct 144 into the motor chamber 16 to raise the pressure in such chamber and effect initial movement of the piston 14.

It will be noted that this operation provides for a limited energization of the motor 10 for a given distance of movement of the vacuum valve 130 after the latter is engaged by the seat 131. The rate of the building up of pressure in the chamber 16, accordingly, is limited and the piston 14 is prevented from "jumping" from its off position.

Further movement of the plunger 94 to the right will effect further movement of the central portion of the lever 122. The lower end of this lever is limited in its movement by the screw 143. Hence, further movement imparted to the center of the lever will move the air valve 123 completely away from its seat, for example, as shown in Figure 3. It will be understood that the maximum movement of the parts is shown in Figure 3 and that movement of the parts to the extent illustrated is not necessary for the full energization of the booster motor.

As the motor is initially energized and pressure increases in the chambers 120 and 121, air will flow through opening 117 into the chamber 118 to act against the diaphragm 115 to oppose movement of the tubular member 110. Thus an elastic fluid reaction is provided, opposing movement of the plunger 94, and such reaction will be transmitted to the pedal 89. Particular attention is invited to the fact that the plunger 94 is relatively large while the diaphragm 115 is smaller than the diaphragm of my copending applications referred to above. Thus, relatively low hydraulic pressures acting on the full area of the plunger 94 will move the tubular member 110 against pressures increasing in the chamber 118 without the exertion of substantial force on the pedal. Of course, this elastic fluid reaction increases as motor energization increases together with pressures in the chamber 118. A soft pedal is thus provided during initial brake operations as is desired, but an increasing reaction is transmitted to the pedal even during such initial booster brake operations.

As pressure between the hydraulic plungers increases while increased force is exerted against the pedal 89, a point will be reached at which the hydraulic plunger operating pressures will be sufficient to overcome the loading of the spring 106. This point will be reached when the right-hand end of the stop member 97 (Figures 2 and 3) is slightly spaced from the inner end of the cup 101. When a pedal-generated hydraulic pressure sufficient to overcome the spring 106 is reached, the seal 102 and cup 100 will be moved slightly to the left to engage the inner end of the cup 100 with the stop member 97 as shown in Figure 3. This slight movement of the cup 100 disengages the flange 101 from the adjacent end of the sleeve 79. The hydraulic pressure between the two plungers therefore acts in opposite directions against these plungers and will result in a net effective pressure acting toward the right under the conditions shown in Figure 3. This net pressure is determined by the difference in the areas between the two hydraulic plungers and the hydraulic pressure acting between the plungers. Accordingly, at a given point in the operation of the apparatus, the effective master cylinder pressures acting to the right against the plunger 94 will be reduced, and the pressures acting on the diaphragm 115 will be more effective for transmitting reaction pressures back to the pedal 89. The apparatus therefore functions to provide light but increasing elastic fluid pressures during initial stages of brake operation, followed by increasing elastic fluid pressures transmitted to the brake pedal. The maximum reaction of the diaphragm 115 becomes effective in accordance with the design of the parts preferably when hydraulic line pressures in the brake system reach 80–90 p.s.i., or approximately when the brake shoes engage the brake drums.

It will be noted that preferably the entire valve operation described above takes place prior to the opening of the residual pressure valve 85 (Figures 2 and 3). The residual pressure valve resist flow of fluid into the chamber 41, but the hydraulic fluid flows freely through passage 83 to effect operation of the plunger 94. When master cylinder pressures reach the necessary point, the residual pressure valve 85 will open and fluid will flow into the chamber 41. Assuming that motor energization has effected movement of the plunger 35 (Figure 1) before the pressure in the chamber 84 reaches a point with respect to normal pressures in the chamber 41 under which the residual pressure valve would open, movement of the plunger 35 will reduce pressures in the chamber 41, thus increasing differential pressures on opposite sides of the residual pressure valve to provide for the flow of hydraulic fluid into the chamber 41. Shortly after the beginning of the actual movement of the plunger 35, pressures in the chamber 41 will equal pedal generated pressures in the master cylinder and such pressures, acting back of the plunger 35, will assist the motor 10 in transmitting force to the plunger 35. Thus the operator performs part of the work of applying the brakes, and pressure in the chamber 33 reacts through the plunger 35 to transmit direct hydraulic pressures to the master cylinder. These direct hydraulic pressures will become effective at about the point where the diaphragm 115 reaches its point of maximum effectiveness for elastically reacting against the brake pedal. Thus, a progressively increasing reaction is provided throughout the operation of the brake pedal up to a maximum brake application.

The functioning of the member 70 is of no particular importance in conjunction with the present invention. Attention is merely invited to the fact that as soon as the plunger 35 is moved a slight distance from its normal off position, pressure of the projection 71 will be released from the ball 39 and the spring 38 will seat this ball and hold it seated throughout each brake application.

The manner in which the parts return to normal position upon the releasing of the brake pedal will be apparent. When the pedal 89 is released, there will be an immediate pressure drop between the hydraulic plungers in Figures 2 and 3 and the spring 141 will return the lever 122 to its normal position shown in solid lines in Figure 2. It is not necessary to provide any spring means for releasing the valve seat 131 from the valve 130 since the pulling of hydraulic fluid back into the master cylinder from the space between the hydraulic plungers will effect such operation. As a matter of fact, in most instances this operation will be performed by air pressure in the chamber 118, which pressure will have been built up during the proceeding brake application. The relieving of pressure between the hydraulic plungers of course will permit the spring 106 (Figure 2) to return the cup 100 to its normal position. The stop member 97 limits movement of the valve operating elements toward the left in Fig. 2, and the stop washer 108 limits movement of the valve operating parts toward the right as shown in Figure 3. The return of the valve operating parts to normal position de-energizes the motor 10, and the spring 148 returns the plunger 35 to normal position while the spring 26 returns the piston 14 to normal position. Obviously, the residual pressure valve acts to retain the proper residual pressure in the brake lines, and such valve may or may not be used in the master cylinder, as may be desired. It such residual pressure valve is omitted, the only resistance aside from mechanical and line frictions which oppose initial movement of the brake pedal will be conventional return spring resistance in the master cylinder.

It is to be understood that the form of the invention shown and described is to be taken as a preferred example of the same and that various changes in the shape, size and arrangement of the parts may be made as do not depart from the spirit of the invention or the scope of the appended claims.

I claim:

1. A motor mechanism comprising a fluid pressure motor, a valve mechanism connected to said motor and to sources of relatively high and low pressures and normally balancing pressures in said motor, a valve operating device engageable with said valve mechanism to operate it to connect said source of high pressure to said motor, said device comprising a control chamber and a control plunger therein, means connected for supplying hydraulic fluid to said control chamber to operate said control plunger, a diaphragm connected to said valve operating device and arranged to be subject to differential pressure in said motor to increasingly oppose movement of said valve operating device as said motor becomes increasingly energized, and means separate from said valve operating device and exposed to hydraulic pressure in said control chamber and engageable with said valve operating device when such pressure increases to a predetermined point for reducing the effectiveness of hydraulic pressures in such chamber acting on said control plunger.

2. A motor mechanism comprising a fluid pressure motor, a valve mechanism connected to said motor and to sources of relatively high and low pressures and normally balancing pressures in said motor, a valve operating device engageable with said valve mechanism to operate it to connect said source of high presure to said motor, said device comprising a control chamber and a control plunger therein, means connected for supplying hydraulic fluid to said control chamber to operate said control plunger, a diaphragm connected to said valve operating device and arranged to be subject to differential pressures in said motor to increasingly oppose movement of said valve operating device as said motor becomes increasingly energized, an opposing plunger in said chamber subject to hydraulic pressure therein to tend to move it in a direction opposite to movement of said control plunger, and biased to a normal position, and lost motion means connecting said control plunger to said opposing plunger whereby the biasing of said opposing plunger is overcome by predetermined hydraulic pressure in said control chamber to reduce the net effective pressure in said chamber tending to operate said valve operating device.

3. A motor mechanism comprising a fluid pressure motor, a valve mechanism connected to said motor and to sources of relatively high and low pressures and normally balancing pressures in said motor, a pedal operated master cylinder, means connected to be operated by fluid displaced from said master cylinder and comprising a control plunger connected to said valve mechanism to operate it to connect said motor to said high pressure source, means connected to be operated by differential pressures in said motor for opposing operation of said control plunger, and means connected to be operated by hydraulic pressures affecting said control plunger to hydraulically oppose operation thereof when such hydraulic pressures reach a predetermined point.

4. A mechanism according to claim 3 wherein said means for hydraulically opposing operation of said control plunger comprises an opposing plunger smaller in diameter than said control plunger, means biasing said opposing plunger to a normal position, and lost motion means connecting said opposing plunger to said control plunger whereby, when hydraulic pressures affecting said control plunger increase to a predetermined point, said opposing plunger will take up said lost motion to reduce the effectiveness of such hydraulic pressures for operating said control plunger.

5. A motor mechanism comprising a fluid pressure motor, a valve mechanism connected to said motor and to sources of relatively high and low pressures and normally balancing pressures in said motor, a pair of axially alined cylinders of different diameters opening into each other, a control piston in the cylinder of larger diameter connected to said valve mechanism, a piston in the cylinder of smaller diameter, said pistons forming therebetween a hydraulic control chamber, means for supplying hydraulic fluid to said control chamber to move said control piston and operate said valve mechanism, means connected to be subject to pressures in said motor for opposing movement of said control piston, means biasing the smaller piston to a normal position in the direction of said control piston, and a lost motion connection between said pistons whereby, when hydraulic pressures in said control chamber reach a predetermined point, the smaller piston will take up said lost motion and transmit a force to said control piston to reduce the effectiveness of pressure in said hydraulic chamber tending to move said control piston.

6. A motor mechanism comprising a fluid pressure motor having a pressure responsive unit, a valve mechanism connected to said motor and to sources of relatively high and low pressures and normally balancing pressures in said motor, a valve operating device engageable with said valve mechanism to operate it to connect said source of high pressure to one end of said motor to operate said pressure responsive unit, said valve operating device comprising a control chamber and a hydraulic pressure responsive element therein, means connected for supplying hydraulic fluid to said control chamber to operate said hydraulic pressure responsive element, an elastic fluid pressure responsive element connected to said valve operating device and arranged to be subject to differential pressures in said motor to oppose movement of said valve operating device, and hydraulically operable means separate from said valve operating device and exposed to the pressure of hydraulic fluid supplied to said control chamber and engageable with said valve operating device for increasing the effectiveness of said elastic fluid pressure responsive element for opposing movement of said valve operating device after hydraulic pressures in said control chamber have increased to a predetermined point.

7. A motor mechanism comprising a fluid pressure motor having a pressure responsive unit, a valve mechanism connected to said motor and to sources of relatively high and low pressures and normally balancing pressures in said motor, a pedal operable source of hydraulic fluid, valve operating means connected to be operated by hydraulic fluid from said last-named source to operate said valve mechanism to connect one end of said motor to said source of high pressure to operate said pressure responsive unit, an elastic fluid pressure responsive device having connection with said valve mechanism and subject to differential pressures in said motor for opposing operation of said valve mechanism by said valve operating means, and hydraulically operable means separate from said valve operating means and exposed to the pressure of fluid displaced from said pedal operable source when the pressure of such fluid reaches a predetermined point and engageable with said valve operating means for increasing the effectiveness of said elastic fluid pressure responsive device in opposing operation of said valve mechanism.

8. A motor mechanism comprising a fluid pressure motor having a pressure responsive unit, a valve mechanism connected to said motor and to sources of relatively high and low pressures and normally balancing pressures in said motor, said valve mechanism having an element movable in one direction to operate it to connect said source of high pressure to one end of said motor to operate said pressure responsive unit, a source of hydraulic fluid having an operating pedal, valve operating means connected to be operated by hydraulic fluid from said last-named source for transmitting a force to said element of said valve mechanism to move it in said direction, movable means connected to be operated by pressure of hydraulic fluid from said last-named source for engaging and transmitting to said valve operating device in a direction opposite said first-named direction a hydraulic force smaller than the force acting on said element in said first-named direction, and means connected to be subject to operation in proportion to the degree of energization of said motor for opposing movement of said valve operating device in said first-named direction.

9. A motor mechanism comprising a fluid pressure motor having a pressure responsive unit, a valve mechanism connected to said motor and to sources of relatively high and low pressures and normally balancing pressures in said motor, said valve mechanism having an element movable in one direction to operate it to connect said source of high pressure to one end of said motor to operate said pressure responsive unit, a source of hydraulic fluid having an operating pedal, valve operating means comprising a hydraulic pressure responsive device connected to be subject to pressure of hydraulic fluid from said last-named source and having a normal area subject to such hydraulic pressure, said hydraulic pressure responsive device being connected to transmit a force to said element of said valve mechanism to move it in said direction, means separate from said valve operating means connected to be operative upon a predetermined increase in hydraulic pressure in said last-named source for reducing the effective area of said hydraulic pressure responsive device, and means connected to be subject to operation in proportion to the degree of energization of said motor for opposing movement of said valve operating device in said first-named direction.

References Cited in the file of this patent

UNITED STATES PATENTS

| | | |
|---|---|---|
| 2,332,340 | Price | Oct. 19, 1943 |
| 2,393,524 | Fant | Jan. 22, 1946 |
| 2,462,015 | Whitten | Feb. 15, 1949 |
| 2,662,376 | Price et al. | Dec. 15, 1953 |
| 2,670,603 | Allin et al. | Mar. 2, 1954 |
| 2,797,665 | Chouings | July 2, 1957 |